United States Patent [19]

Madic

[11] Patent Number: 5,422,084
[45] Date of Patent: Jun. 6, 1995

[54] PROCESS FOR DISSOLVING PLUTONIUM DIOXIDE BY MEANS OF OH− RADICALS PRODUCED BY THE RADIOLYSIS OF WATER USABLE FOR THE TREATMENT OF DISSOLVING FINES AND PLUTONIFEROUS WASTE

[76] Inventor: Charles Madic, 5 Place du Marché, 94320 Thiais, France

[21] Appl. No.: 26,869

[22] Filed: Mar. 5, 1993

[30] Foreign Application Priority Data

Mar. 5, 1992 [FR] France ................. 92 02651

[51] Int. Cl.⁶ ................. B01F 1/00
[52] U.S. Cl. ................. 423/20; 423/8; 423/251; 976/DIG. 278
[58] Field of Search ........ 252/627; 423/3, 20, 423/251, 8; 976/DIG. 278

[56] References Cited

U.S. PATENT DOCUMENTS

| | | | |
|---|---|---|---|
| 3,813,464 | 5/1974 | Ayers | 423/20 |
| 3,976,775 | 8/1976 | Tallent | 423/251 |
| 4,172,775 | 10/1979 | Donohue | 204/157.1 R |
| 4,333,912 | 6/1982 | Mills et al. | 423/20 |
| 4,528,130 | 7/1985 | Ledebrink et al. | 252/643 |
| 4,686,019 | 8/1987 | Ryan et al. | 204/1.5 |
| 4,749,519 | 6/1988 | Koehly et al. | 252/627 |
| 5,069,827 | 12/1991 | Machuron-Mandard et al. | 252/626 |
| 5,135,728 | 8/1992 | Karraker | 423/20 |

FOREIGN PATENT DOCUMENTS 0158555 10/1985 European Pat. Off. .

OTHER PUBLICATIONS

Chemical Abstracts, vol. 114, Columbus, Ohio, US; Abstract No. 132888c, Andreichuk et al., "Plutonium (III) Oxidation Under Alpha-Irradiation in Nitric Acid Solutions", p. 704, col. 2 & J. Radioanal. Nucl. Chem. vol. 142, Eng. pp. 427–432.

Cleveland, J. M., "The Chemistry of Plutonium", Gordon and Breach Science Publisher, 1973, pp. 35–44.

Primary Examiner—Ngoclan T. Mai

[57] ABSTRACT

The invention relates to a process for dissolving plutonium dioxide by means of OH− radicals produced by radiolysis of water and usable for the treatment of dissolving fines and plutoniferous waste.

To this end, contacting takes place in a reactor (1) of solid products containing $PuO_2$ coming from the hopper (5) with an aqueous nitric solution (3) irradiated by radiation or charged particles for producing OH− radicals by radiolysis of said solution, in the presence of a reagent such as $N_2O$, able to trap the solvated electrons and the H− radicals produced in simultaneous manner and optionally a redox mediator such as silver.

Irradiation can take place by an alpha or beta emitter present in the solution or by an external source such as an irradiator or an electron accelerator.

22 Claims, 4 Drawing Sheets

PROCESS FOR DISSOLVING PLUTONIUM DIOXIDE BY MEANS OF OH− RADICALS PRODUCED BY THE RADIOLYSIS OF WATER USABLE FOR THE TREATMENT OF DISSOLVING FINES AND PLUTONIFEROUS WASTE

The present invention relates to a process for dissolving plutonium dioxide present in solid products.

It is more particularly applicable to solid products constituted by batches of $PuO_2$ or mixed oxides (U, Pu)$O_2$ present in impure form and which are to be recycled and which come from installations for the production of new plutonium-based nuclear fuels intended for fast neutron reactors or light water reactors (MOX fuels), as well as plutoniferous waste such as the dissolving fines of irradiated fuels, incineration ash and miscellaneous waste materials such as those from processes, technological waste and laboratory waste.

The processes used at present for dissolving plutonium dioxide can be placed in three major categories which are:

a) processes without changing the oxidation state of the plutonium, which remains in the state Pu(IV),
b) reduction processes reducing the plutonium in form Pu(III) and
c) oxidation processes leading to the obtaining of Pu(VI) ions in solutions.

The processes belonging to the first category and as described by J. M. CLEVELAND "The Chemistry of Plutonium" Gordon and Breach, 1970, consist of attacking the solid products with a mixture of concentrated nitric acid and hydrofluoric acid with reflux boiling. Although these processes are used industrially, they suffer from the disadvantage of using highly corrosive reagents, due to the presence of fluorine ions.

The reduction processes belonging to the second category and as described in EP-A-312 433, consist of carrying out the dissolving in a sulphuric medium, under the action of powerful reducing agents, which are preferably generated by electrolysis in order to allow reagent economies. Although these processes are satisfactory they involve the use of complex equipment (electrolyzer) difficult to use in certain applications.

The oxidation processes belonging to the third category and such as described in EP-A-158 555, consist of carrying out the oxidation of plutonium by means of strong oxidizing agents such as silver (II) regenerated by electrolysis. They also suffer from the disadvantage of requiring the use of complex equipment (electrolyzer).

The present invention specifically relates to a process for dissolving plutonium dioxide by oxidation and which does not require the use of complex equipment such as an electrolyzer.

The invention therefore relates to a process for dissolving the plutonium dioxide present in solid products, characterized in that it comprises a) contacting the solid products with an aqueous nitric acid solution subject to radiation or charged particles, producing free OH− radicals by radiolysis of said solution, in the presence of a reagent able to trap the very reducing species, such as solvated electrons and the H− radicals simultaneously produced and
b) recovering the nitric aqueous solution in which has been dissolved the plutonium.

In this process, use is made of the oxidizing power of the OH− free radicals produced in situ by radiolysis of the water in order to oxidize the plutonium (IV) into plutonium (VI) and dissolve it.

Thus, the OH− radical is a highly oxidizing species, which participates in a very high redox potential pair: 2.6 V/ENH. It is produced during the radiolysis of water by means of radiation, such as alpha, beta or gamma radiation or other charged particles such as electrons. The radiolytic yield $G_{OH}$-corresponding to the number of particles produced for an absorbed energy in the water equal to 100 eV is close to 6, but other primary species are produced by the radiolysis of the water and in particular the solvated electron $e^-_{solv}$, which is a highly reducing species and formed in a quantity equal to that of the OH− radical. These species which have a very short life evolve rapidly in order to create secondary radiolysis products constituted by $O_2$, $H_2$ and $H_2O_2$.

According to the invention, a very oxidizing condition is imposed on the aqueous solution, by carrying out the radiolysis in the presence of a reagent able to trap the solvated electrons and H− radicals simultaneously produced, so that the latter do not react with the OH− radicals and so that the population of OH− radicals produced can be used for the desired oxidation reactions of plutonium (IV) into plutonium (VI).

The reagent able to trap the solvated electrons and the H− radicals can in particular be nitrogen protoxide $N_2O$.

According to a preferred embodiment of the invention, the aqueous nitric solution also incorporates a redox mediator having a redox potential between 1.43 and 2.6 V/ENH.

The presence in the aqueous nitric solution of such a redox mediator makes it possible to use the OH− radicals produced by radiolysis for oxidizing the reduced form of said mediator, the latter then being used for oxidizing the plutonium and for dissolving it in solution.

The presence of such a mediator is particularly interesting for the treatment of plutoniferous waste. Thus, in the case of such waste, the contact between the oxidizing reagent (OH−) and the $PuO_2$ grain only occurs some time after the in situ production of OH− radicals, because it is necessary for these radicals to diffuse towards the site to be attacked. This can lead to a non-negligible reagent loss because the OH− radicals have a short life.

To obviate this disadvantage, use is made of the OH− radicals for converting into a powerful oxidizing agent the reduced form of a redox mediator present in solution and which will more easily be able to oxidize Pu (IV) into Pu (VI).

The redox mediators which can be used are in particular Ag(I), Ce(III) and Co(II). However, when using Ce(III) or Co(II), it is necessary to operate at high temperatures in order to obtain a usable $PuO_2$ attack kinetics. However, with silver it is possible to operate at ambient temperature.

According to the invention, the radiation usable for producing free OH− radicals by radiolysis of water can be alpha, beta or gamma radiation, or charged particles such as electrons.

When using alpha radiation, the latter can be directly produced in the solution by the plutonium 238 nuclides present in the solid products to be dissolved. It is also possible to use as alpha radiation, the radiation produced by an alpha emitter added to the aqueous nitric solution.

Examples of usable alpha emitters are americium 241, curium 244 and plutonium nuclides.

When using $\beta^-$ radiation, the latter can be produced by a $\beta^-$ emitter dissolved in the aqueous nitric solution, e.g. strontium 90 or yttrium 90.

The radiation used can also be produced by a radiation source located outside the solution, e.g. from an irradiator such as a cobalt source. It is also possible to use charged particles such as the electrons produced by an electron accelerator.

The solid products which can be treated by the process according to the invention can be in various forms. Thus, it can be in the form of plutonium oxide or mixed plutonium oxide such as batches or impure $PuO_2$ and batches of poorly prepared, mixed oxide-based fuels. It can also apply to various waste types, such as dissolving fines of irradiated fuels, incineration ash, miscellaneous organic waste produced during nuclear fuel reprocessing operations or plutonium fuel preparations, e.g. technological waste and laboratory waste and in particular the waste of organic materials such as plutonium-contaminated cellulose or plastic materials.

In the case where the solid products to be treated are constituted by waste, it is preferable to use as the radiation source an external source such as an irradiator or an electron accelerator.

For performing the process according to the invention, it is possible to carry out contacting in a reactor filled with a $N_2O$-saturated aqueous nitric solution and optionally containing a redox mediator such as silver nitrate. The nitric acid concentration of the solution is advantageously 2 to 6 mole/l. When the solution incorporates silver, the silver concentration is preferably 0.01 to 0.1 mole/l.

Advantageously continuous operation takes place by continuously introducing into the reactor the nitric solution and the solid products containing the plutonium to be dissolved and by continuously drawing off from the reactor the aqueous solution containing the dissolved plutonium.

For example, it is possible to continuously introduce into a reactor containing an aqueous nitric solution incorporating the alpha emitter or beta emitter, the solid products containing the plutonium to be dissolved, nitric acid and the agent able to trap the solvated electrons and the $H^-$ radicals, continuously draw off from the reactor part of the solution, separate from the drawn off solution the plutonium contained therein in order to obtain a Pu-depleted solution and recycle into the reactor the thus plutonium depleted solution.

The plutonium can be separated from the aqueous solution by conventional processes, e.g. by extraction in an organic solvent such as tributyl phosphate.

BRIEF DESCRIPTION OF THE DRAWINGS

The invention is described in greater detail hereinafter relative to non-limitative embodiments and with reference to the attached drawings, wherein show.

EXAMPLE 1

Figure 1:
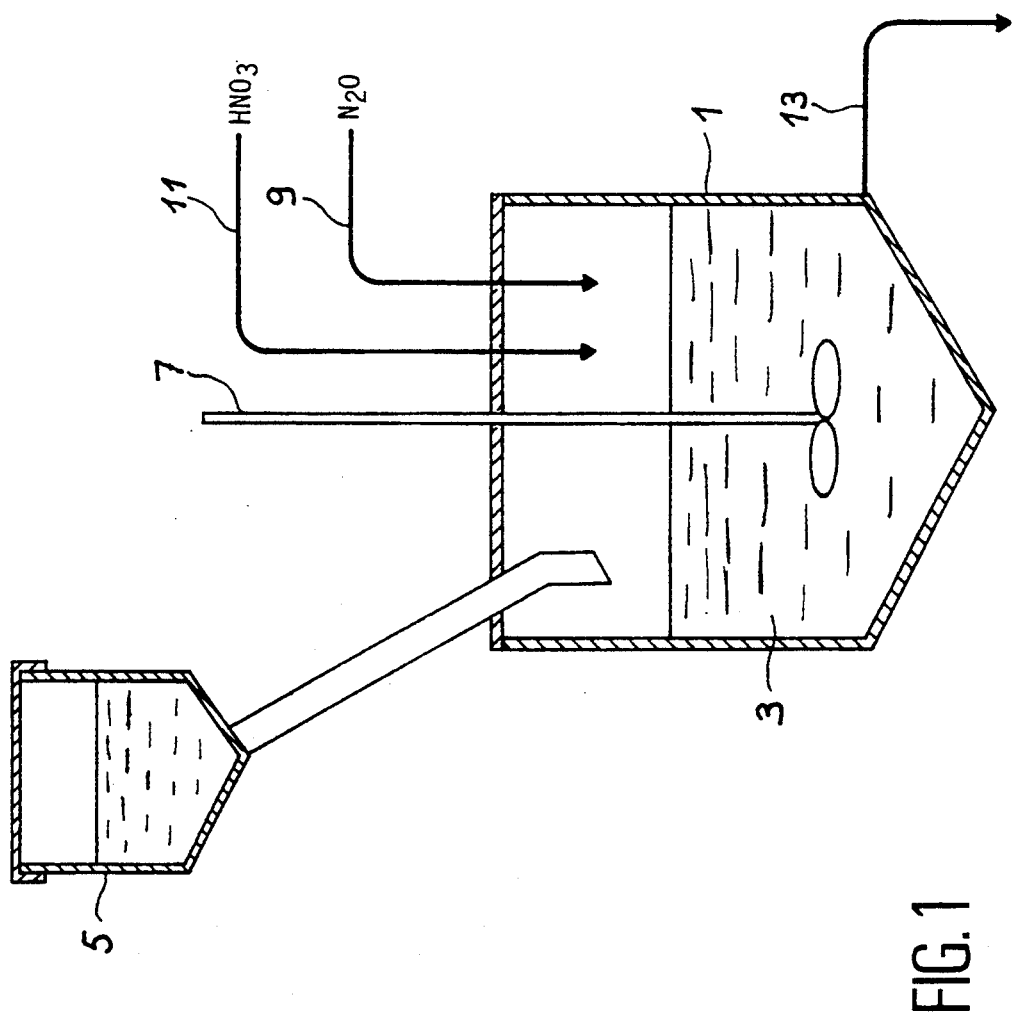
FIG. 1 Diagrammatically an installation for continuously dissolving plutonium dioxide.

In this example, a $^{238}PuO_2$ powder is dissolved in a nitric medium using the $^{238}Pu$ of the oxide to be dissolved as the alpha emitter.

To this end, e.g 100 g of $^{238}PuO_2$ powder are introduced into 1 liter of a 6 mole/l aqueous nitric acid solution which is saturated with $N_2O$. After a contact time of approximately 28 h at ambient temperature, it is possible to bring about the total dissolving of the plutonium oxide $^{238}PuO_2$.

After dissolving, the plutonium is in form Pu(VI), but it can be reduced to Pu(IV) by treatment with nitrous vapours and then reextracted from the aqueous solution by an organic solvent, e.g. using the PUREX process or a liquid-liquid extraction with the aid of a tertiary amine nitrate. The presence of $N_2O$ in the aqueous dissolving solution has no consequence for the chemical procedures subsequently used.

Thus, in this example use is made of the alpha radiation emitted by plutonium 238 for creating in the aqueous solution a flow of $OH^-$ radicals resulting from the dissolving of $PuO_2$.

It is known that an alpha ray of 5.5 MeV which deposits its energy in the aqueous solution in which is immersed the $^{238}PuO_2$ powder, creates $3.3 \times 10^5$ $OH^-$ radicals, which corresponds to a yield of $G_{OH^-}=6$.

Thus, the alpha rays of 5.5 MeV coming from a 1 Ci source are able to bring about the dissolving of 9.8 mg of $PuO_2$/h according to the dissolving reaction:

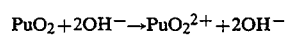

$$PuO_2 + 2OH^- \rightarrow PuO_2^{2+} + 2OH^-$$

The specific activity of plutonium 238 is 17 Ci/g, so that the alpha radiation emitted by 1 gram of $^{238}Pu$ create a flow of $OH^-$ radicals able to bring about the dissolving of 166.6 mg of $PuO_2$/h.

If all the $OH^-$ radicals were used, it would be necessary to obtain the complete dissolving in approximately 7 h. However, in practice, only a fraction of the alpha rays can emerge from the $^{238}PuO_2$ grain (the passage of an alpha ray in $PuO_2$ is approximately 3.5 $\mu m$), so that there is an efficiency loss of a factor of 2. Moreover, the entire population of $OH^-$ radicals created in solution does not reach the reaction site, so that once again there is an efficiency loss by a factor of 2. Therefore, the total dissolving of the plutonium oxide takes place in approximately 28 h.

EXAMPLE 2

In this example, $^{238}PuO_2$ is dissolved by using as the radiation source the alpha rays emitted by $^{238}Pu$, but working takes place in the presence of a redox mediator in the aqueous solution.

To this end, e.g. 100 g of $^{238}PuO_2$ powder are introduced into 1 liter of $N_2O$-saturated 6 mole/l aqueous nitric acid solution and incorporating 0.1 mole/l of silver nitrate. After approximately 14 h at ambient temperature, it is found that all the $^{238}PuO_2$ powder has been dissolved in the solution.

Under the conditions of this example, the $OH^-$ radicals created and which have a short life are converted into more stable Ag(II) ions, which diffuse into the solution and bring about the dissolving of the plutonium oxide. Under these conditions, no efficiency loss is observed, except for that corresponding to the alpha rays which lose their energy in the $^{238}PuO_2$ solid.

EXAMPLE 3

This example also uses the alpha radiation coming from nuclides of plutonium in order to e.g. dissolve 100 g of $PuO_2$ resulting from the reprocessing of fuels of the UOX type. In this case, the specific activity of the plutonium is close to 0.5 Ci/g and the average energy of the alpha rays is approximately 5.43 MeV.

For example, 100 g of $PuO_2$ are dispersed in 1 liter of a $N_2O$-saturated 6 mole/l aqueous nitric solution. After roughly 40 days at ambient temperature, the $PuO_2$ is completely dissolved. In this case, the alpha rays emitted by the Pu nuclides contained in the oxide have the capacity to bring about the dissolving of approximately 4.3 Mg of $PuO_2$/h/g of oxide, in view of the fact that a 1 Ci alpha radiation source of 5.43 MeV brings about the dissolving of 9.7 mg of $PuO_2$/h.

Therefore, total dissolving could take place in approximately 240 h. However, efficiency losses linked with the loss of alpha rays in the solid and the loss of $OH^-$ radicals lead to a significant overall dissolving time of approximately 960 h, i.e. approximately 40 days.

EXAMPLE 4

This example follows the same operating procedure as in example 3 for dissolving 100 g of $PuO_2$ coming from fuels of the UOX type, but to the aqueous solution is added 0.1 mole/l of silver nitrate. In this case, it is possible to bring about the complete dissolving of the plutonium oxide $PuO_2$ in approximately 20 days.

EXAMPLE 5

In this example the plutonium oxide $^{238}PuO_2$ dissolving is brought about by adding to the aqueous solution plutonium 238 in order to obtain a higher total activity, e.g. 5000 Ci. In this case use is made of a $N_2O$-saturated 6 mole/l aqueous nitric acid solution also containing 100 g/l of 238 Pu and continuous dissolving takes place in the installation shown in FIG. 1.

In this installation, the attack reactor (1) contains an aqueous solution (3) of nitric acid and plutonium saturated with $N_2O$. Into this solution and from the feed hopper (5) is introduced the $PuO_2$ to be dissolved at the desired flow rate and the entire mixture is stirred by means of the stirrer (7). Into the reactor and using pipe (9) is also introduced $N_2O$ and by the pipe (11) of 6N nitric acid. The dissolving solution is drawn off from the reactor by means of the pipe (13).

In this case, the presence of $^{238}Pu$ in the aqueous starting solution makes it possible to obtain a dissolving capacity close to 25 g/h. For continuous operation, the $PuO_2$ and $HNO_3$ introduction flow rates and the solution drawing off flow rate are adjusted in such a way that the aqueous solution present in the reactor (1) always has the desired plutonium 238 concentration in order to obtain an acceptable dissolving speed.

EXAMPLE 6

In this example plutonium oxide from a UOX fuel is dissolved by adding to the aqueous nitric solution plutonium, e.g. plutonium having the same isotopic composition as that of the UOX fuel to be dissolved in order to speed up dissolving.

Dissolving can also take place in the installation shown in FIG. 1 adding at the start 5000 g of plutonium so that the $N_2O$-saturated solution in the reactor has a total activity of 5000 Ci. Under these conditions, once again 25 g/h of plutonium oxide are dissolved.

EXAMPLE 7

This example follows the same operating procedure as in example 5 for continuously dissolving $^{238}PuO_2$, but to the attack solution is also added a redox mediator constituted by silver nitrate at a rate of 0.1 mole/l. There is also an introduction of 0.1 mole/l of silver nitrate into the nitric feed solution introduced by the pipe (11). The addition of silver nitrate makes it possible to obtain a dissolving capacity of 47 to 48 g/h of $PuO_2$.

EXAMPLE 8

This example uses as the $OH^-$ radical production source, the alpha radiation emitted by a transuranium element nuclide constituted by $^{241}Am$ (3.43 Ci/g) added to the aqueous solution. Dissolving can take place in the installation shown in FIG. 2. The latter carries the same references as in FIG. 1 for designating the components of the installation already shown in FIG. 1.

Figure 2:
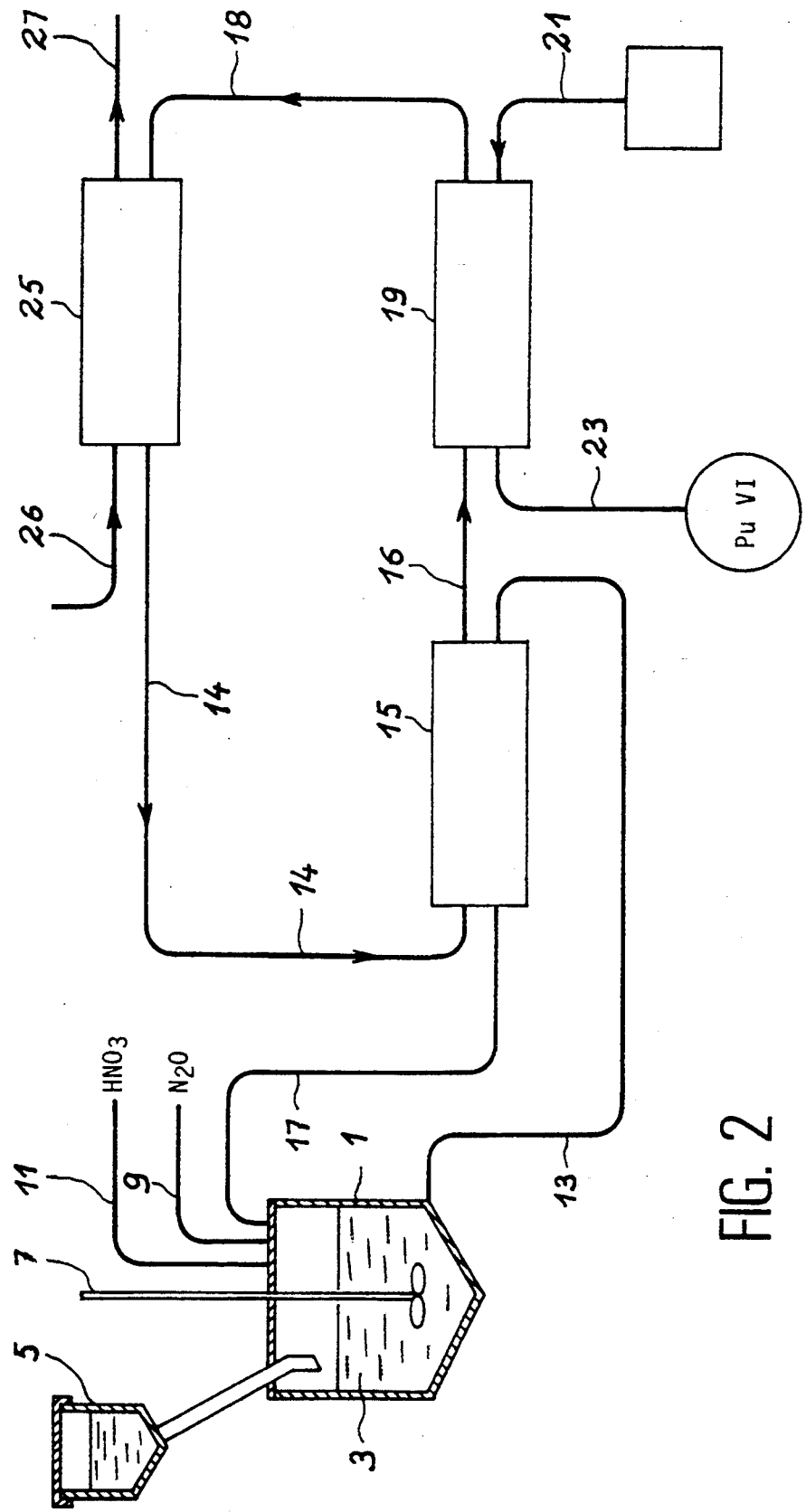
FIG. 2 Diagrammatically an installation for the continuous dissolving of $PuO_2$ in the presence of an alpha emitter added to the nitric solution.

The difference between these two installations relates to the treatment of the plutonium solution drawn off from the reactor (1) by the pipe (13). In the case of FIG. 2, said solution undergoes a plutonium extraction treatment in (15), followed by recycling to the reactor (1) by the pipe (17) with the nuclide contained therein.

The aqueous nitric solution present in the reactor (1) contains 6 mole/l of $HNO_3$ and to it are added 1458 g of $^{241}Am$ in order to have a total activity of 5000 Ci. With this activity a dissolving capacity of 48 g/h of $PuO_2$ should be obtained, but the dissolving capacity is in fact only close to 25 g/h. This efficiency drop is due to the short life of the $OH^-$ radicals, whereof approximately half the population disappears before reaching the reaction site.

The nitric solution containing the plutonium (VI) drawn off by the pipe (13) is introduced into a liquid-liquid extraction installation (15), where it is brought into countercurrent contact with an organic solvent based on tributyl phosphate introduced by the pipe (14). Thus, the plutonium is extracted in the organic solvent and it is possible to recycle into the reactor (1) by means of the pipe (17) the nitric solution containing the americium 241. The plutonium extracted in the organic solvent passing out of the extraction stage (15) by the pipe (16) can be reextracted in an aqueous nitric solution in (19) by countercurrent contacting with a nitric solution introduced by the pipe (21), so as to recover in (23) a purified Pu(VI) solution. The organic solvent passing out of the reextraction installation (19) by the pipe (18) can be purified in (25) by contacting with an appropriate washing solution introduced at (26) and collected at (27), followed by recycling by (14) into the plutonium extraction installation (15).

EXAMPLE 9

The same operating procedure as in example 8 is adopted for dissolving $PuO_2$, but 59 g of $^{244}Cm$ (85 Ci/g) are added in place of 1458 g of $^{241}Am$. Under these conditions 51 g/h of $PuO_2$ should be dissolved, but in practice there is a 25 g/h $PuO_2$ dissolving yield.

EXAMPLE 10

In this example $PuO_2$ dissolving takes place using as the radiation source a pure beta emitter constituted by strontium 90, whose half-life period is 28.15 years and has an activity of 52 Ci/g. The average energy of the beta rays is 0.196 MeV, which corresponds to a OH radical production yield of $1.16 \times 10^4 OH^-$ by absorbed $\beta^-$ radiation, which corresponds to a $G_{OH^-}$ of 6.

In this case, dissolving can take place as in example 8 in the installation shown in FIG. 2 replacing the americium by strontium 90. Using a strontium 90 activity of 5000 Ci, a $N_2O$-saturated 6 mole/l nitric acid solution and 0.1 mole/l of silver nitrate, 1.73 g of $PuO_2/h$ is dissolved at ambient temperature.

EXAMPLE 11

This example follows the sane operating procedure as in example 10, but the strontium 90 is replaced by yttrium 90. Equivalent results are obtained using an yttrium 90 activity of 5000 Ci.

EXAMPLE 12

This example relates to the dissolving of the insoluble $PuO_2$ fraction present in dissolving fines obtained from the nitric dissolving of irradiated fuels. In this case, the rays are produced by beta and gamma emitters present in the dissolving fines or the liquid obtained from the dissolving operation.

The beta and gamma rays produced by these emitters have on average an energy of 1.5 MeV and the oxidizing action of the $OH^-$ radicals produced by these rays can be used not only for dissolving $PuO_2$, but also for transforming the ruthenium of the liquid or fines into $RuO_4$, which is a volatile compound.

Figure 3:
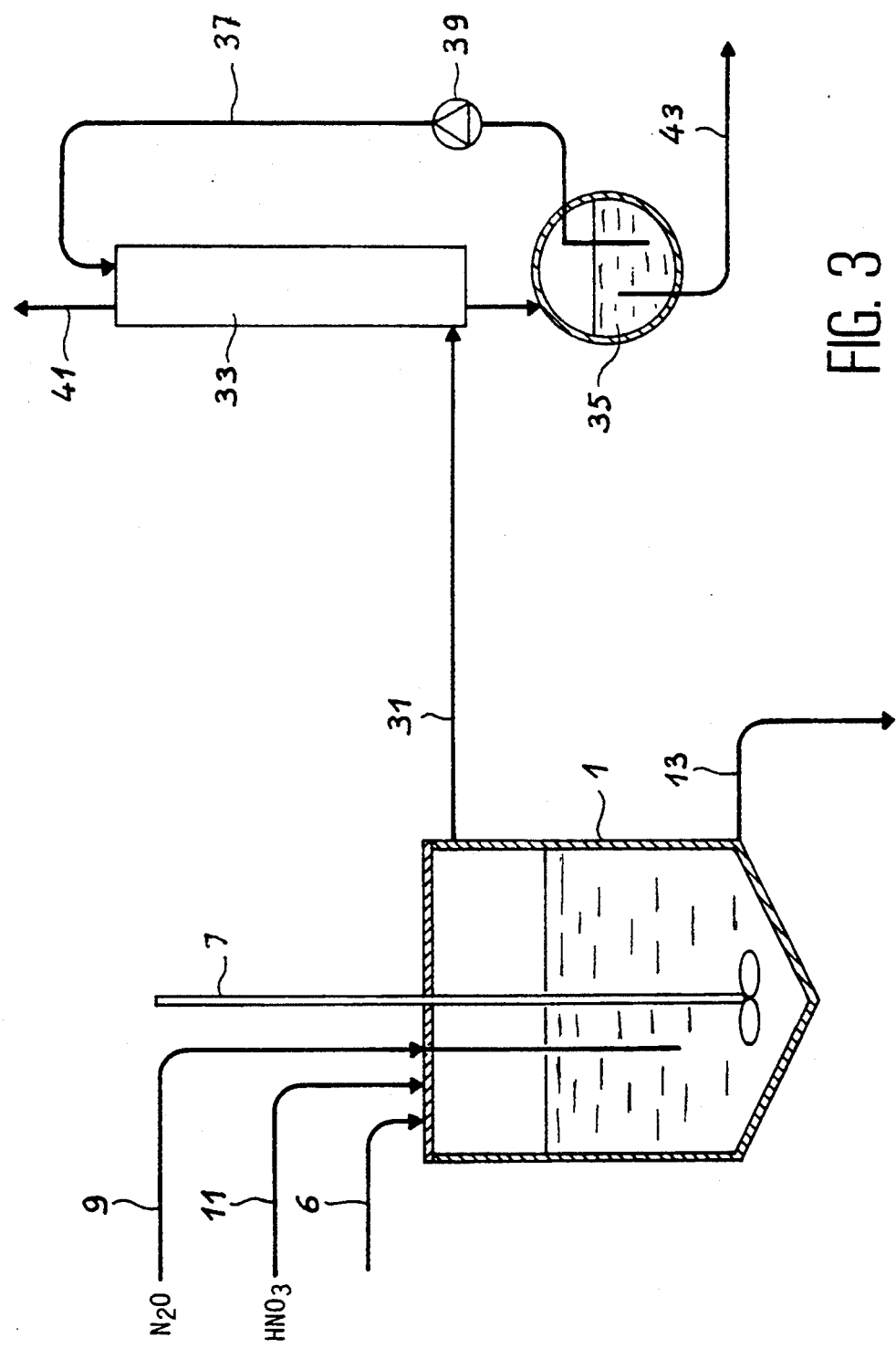
FIG. 3 Diagrammatically an installation for the recovery of the plutonium dioxide present in the dissolving fines.

Thus, in the case of dissolving fines with a specific activity of 100 Ci/g, the oxidation capacity of rutheniun and plutonium is equal to at the most 50 mg/h of ruthenium and 267 mg/h of $PuO_2$. The installation shown in FIG. 3 can be used for carrying out this dissolving.

This installation comprises an attack reactor (1) equipped with a stirrer (7) and into which can be introduced the liquid containing the dissolving fines by means of a pipe (6), 6N nitric acid by the pipe (11) and $N_2O$ by the pipe (9). The dissolving solution can be drawn off by the pipe (13). The volatile products such as $RuO_4$ produced in the upper part of the reactor can be discharged by the pipe (31) to a washing column (33) in which the gases are washed by soda coming from a tank (35) and introduced into the upper part of the column (33) by a pipe (37) having a pump (39). The washed gases are discharged by the pipe (41), whilst the ruthenium is separated at the base of the column by the pipe (43).

When the dissolving fines are maintained in the dissolving liquid of the $N_2O$-saturated fuel, the beta-gamma activity of the dissolved fission products adds its effect to that of the beta-gamma activity of the actual fines. Thus, for a UOX fuel irradiated at 33 GWd/t and dissolved at 5000 l/t, the specific activity of the mixture of the attacked liquid and the fines (approximately 0.74 g of fines per liter of attack liquid) is approximately 150 Ci/l. In such a $N_2O$-saturated medium, the ruthenium elimination capacity is 75 mg/h/l of attack liquid in the form of volatile $RuO_4$ and the dissolving capacity of $PuO_2$ is 390 mg of $PuO_2/h/l$ of attack liquid. IN practice, the performances obtained are below these values.

EXAMPLE 13

This example follows the sane operating procedure as in example 12, by introducing into the reactor the dissolving fines with the dissolving liquid, but working takes place at 80° C. so as to benefit from the effect of the redox mediator, cerium (fission product), present in the liquid. In this case, the ruthenium elimination capacity is 75 mg/h/l of attack liquor and the dissolving capacity of $PuO_2$ is 390 mg of $PuO_2/h/l$ of attack liquor.

However, on operating at ambient temperature, the $PuO_2$ dissolving capacity is reduced by half and the ruthenium elimination capacity is reduced by 25%.

EXAMPLE 14

Figure 4:
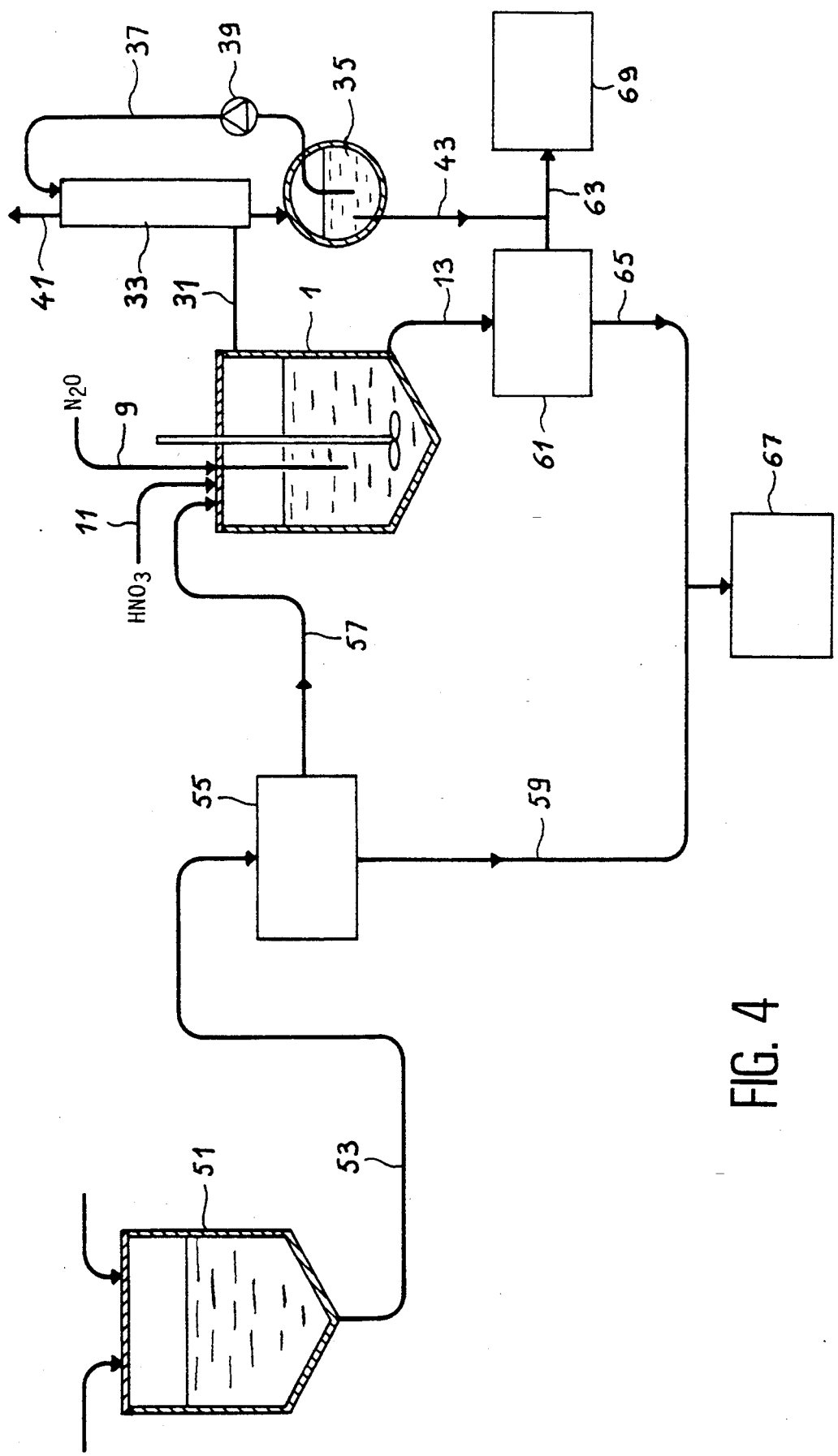
FIG. 4 Another embodiment of a dissolving fines treatment installation.

In this example, the dissolving fines are treated after separating them from the dissolving liquid using the installation shown in FIG. 4. FIG. 4 has the same references for designating the components of the installation already shown in FIG. 3.

In this case, the dissolving fines which are produced with the dissolving liquid in the dissolver (51) are brought by the pipe (53) into a solid-liquid separating installation (55), the separated dissolving fines being introduced by the pipe (57) into the attack reactor (1) and the dissolving liquid being discharged by the pipe (59). In the reactor (1), the dissolving fines are contacted with a $N_2O$-saturated nitric solution and the plutonium-containing nitric solution is discharged by the pipe (13) with the fines, which are separated from the solution in the separating apparatus (61), the fines being discharged by the pipe (63) to a vitrification installation (69), whilst the solution is discharged by the pipe (65) with the dissolving liquid of the pipe (59) to a treatment installation (67) in order to recover the plutonium contained therein. The $RuO_4$ produced in the reactor (1) is discharged by the pipe (31), washed in the column (33) with soda and recovered in the pipe (43) and is then passed with the dissolving fines from the pipe (63) to a vitrification installation (69).

EXAMPLE 15

This example uses the process according to the invention for dissolving the plutonium present in the plutoniferous waste constituted by incineration ash. In this case, preference is given to the use of an external radiation source from an irradiator for creating the $OH^-$ radicals necessary for $PuO_2$ dissolving.

To this end, use is made of the installation shown in FIG. 1, but the attack reactor (1) having a useful volume of 10 l is placed in the cavity of an irradiator supplying a dose rate of $10^5$ Gy/h. The ash from the feed hopper (5) is introduced into the reactor (1), where it is contacted with an aqueous solution containing 6 mole/l of nitric acid, which is saturated with $N_2O$ and by means of the pipe (13) is drawn off the nitric solution containing the plutonium. Under these conditions a dissolving capacity of 40 g/h of $PuO_2$ is obtained.

It would normally be possible to obtain a dissolving capacity of 84.1 g of $PuO_2/h$, but the presence of an inert matrix in the waste leads to a lower dissolving capacity. The latter can be improved by operating in the presence of silver ions.

EXAMPLE 16

The operating procedure of example 15 is followed for dissolving the plutonium present in the plutoniferous waste constituted by incineration ash, but in this case a particle accelerator is used for producing $OH^-$ radicals in the solution.

Working can take place in the installation of FIG. 1, but in this case the reactor (1) is associated with an electron accelerator producing electrons of 1.5 MeV and whose beam supplies a current of 1 mA. Thus, $2 \times 10^{24}$ $OH^-$/h is produced in solution, which leads to a maximum $PuO_2$ dissolving capacity in $N_2O$-saturated nitric medium at ambient temperature of close to 454 g/h. However, this treatment capacity can only be obtained in the presence of a redox mediator constituted by silver nitrate with a concentration of 0.1 mole/l. In the absence of this mediator, the dissolving capacity is reduced by roughly half.

I claim:

1. Process for dissolving plutonium dioxide present in solid products, comprising the steps of
   a) contacting the solid products with an aqueous nitric acid solution, subjecting said aqueous nitric acid solution to radiolysis with rays produced by radiation or charged particles to produce free $OH^-$ radicals in the presence of a reagent able to trap a reducing species, said reducing species comprising solvated electrons and $H^-$ radicals produced during radiolysis and
   b) recovering the aqueous nitric acid solution in which the plutonium has been dissolved.

2. Process according to claim 1, wherein the aqueous nitric acid solution also contains a redox mediator having a redox potential between 1.43 and 2.6 V/ENH.

3. Process according to claim 2, wherein the redox mediator is Ag(I).

4. Process according to claim 1, wherein the rays are alpha rays.

5. Process according to claim 4, wherein the alpha rays are produced directly in the solution by plutonium nuclides present in the solid products to be dissolved.

6. Process according to claim 4, wherein the alpha rays are produced by an alpha emitter added to the aqueous nitric solution.

7. Process according to claim 6, wherein the alpha emitter is americium 241, curium 244 or plutonium nuclides.

8. Process according to claim 1, wherein the rays are $\beta^-$ rays.

9. Process according to claim 8, wherein the $\beta^-$ rays are produced by a $\beta^-$ emitter dissolved in the aqueous nitric solution.

10. Process according to claim 9, wherein the $\beta^-$ emitter is strontium 90 or yttrium 90.

11. Process according to claim 1, wherein the charged particles are electrons produced by an electron accelerator.

12. Process according to claim 1, wherein the rays are produced by a radiation source outside the solution.

13. Process according to claim 1, wherein the reagent able to trap the solvated electrons and the $H^-$ radicals is nitrogen protoxide $N_2O$.

14. Process according to claim 1, wherein the nitric acid concentration of the aqueous solution is 2 to 6 mole/l.

15. Process according to claim 3, wherein the silver concentration of the aqueous solution is 0.01 to 0.1 mole/l.

16. Process according to claim 1, wherein the aqueous nitric acid solution incorporates an alpha or beta emitter to produce the rays for radiolysis and said aqueous nitric acid solution is contained in a reactor, the step of contacting the solid products with the aqueous nitric acid solution includes continuously introducing the solid products into the aqueous nitric acid solution in the reactor, and the step of recovering the aqueous nitric acid solution containing the dissolved plutonium includes continuously withdrawing a portion of the aqueous nitric acid solution from the reactor, separating the plutonium contained in the withdrawn solution to form a plutonium depleted solution and recycling the plutonium depleted solution into the reactor.

17. Process according to claim 16, wherein the plutonium is separated from the drawn off solution by extraction in an organic solvent.

18. Process according to claim 1, wherein the solid products are constituted solely by plutonium dioxide or mixed plutonium oxide.

19. Process according to claim 1, wherein the solid products are dissolving fines containing ruthenium and plutonium, the ruthenium is volatilized and is separated, and the plutonium is dissolved by oxidation reaction with $OH^-$ radicals generated by radiolysis of the solution.

20. Process according to claim 1, wherein the solid products are plutoniferous waste.

21. Process according to claim 12, wherein the solid products are plutoniferous waste.

22. Process according to claim 16, wherein the alpha emitter is americum 241, curium 244 or plutonium nuclides, and the beta emitter is strontium 90 or ytrium 90.

* * * * *

UNITED STATES PATENT AND TRADEMARK OFFICE
CERTIFICATE OF CORRECTION

PATENT NO. : 5,422,084                                Page 1 of 3
DATED      : June 6, 1995
INVENTOR(S): Charles Madic It is certified that error appears in the above-indentified patent and that said Letters Patent is hereby corrected as shown below:

On the title page the following information should be inserted with respect to the Attorney, Agent or firm:

--Pearne, Gordon, McCoy & Granger, Cleveland, Ohio--.

On the title page, item [54] and col 1 line 3, in the title, delete "OH" and insert --OH$^-$--.

Column 1, line 3, in the title, delete "OH" and insert --OH$^-$--.

Column 4, line 8, delete "e.g" and insert --e.g.--.

UNITED STATES PATENT AND TRADEMARK OFFICE
CERTIFICATE OF CORRECTION

PATENT NO. : 5,422,084
DATED : June 6, 1995
INVENTOR(S) : Charles Madic

It is certified that error appears in the above-indentified patent and that said Letters Patent is hereby corrected as shown below:

Column 4, line 31, delete "1 Ci" and insert --1Ci--.

Column 4, line 37, delete "17 Ci/g" and insert --17Ci/g--.

Column 5, line 9, delete "0.5 Ci/g" and insert --0.5Ci/g--.

Column 5, line 18, delete "1 Ci" and insert --1Ci--.

Column 5, line 38, delete "5000 Ci" and insert --5000Ci--.

Column 6, line 1, delete "5000 Ci" and insert --5000Ci--.

Column 6, line 30, delete "5000 Ci" and insert --5000Ci--.

Column 6, line 68, delete "52 Ci/g" and insert --52Ci/g--.

Column 7, line 1, delete "OH" and insert --OH$^-$--.

Column 7, line 7, delete "5000 Ci" and insert --5000Ci--.

Column 7, line 12, delete "sane" and insert --same--.

UNITED STATES PATENT AND TRADEMARK OFFICE
CERTIFICATE OF CORRECTION

PATENT NO. : 5,422,084
DATED : June 6, 1995
INVENTOR(S) : Charles Madic

It is certified that error appears in the above-indentified patent and that said Letters Patent is hereby corrected as shown below:

Column 7, line 15, delete "5000 Ci" and insert --5000Ci--.

Column 7, line 31, delete "rutheniun" and insert --ruthenium--.

Column 7, line 64, delete "sane" and insert --same--.

Signed and Sealed this

Seventh Day of November, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,422,084
DATED : June 6, 1995
INVENTOR(S) : Charles Madic

It is certified that error appears in the above-indentified patent and that said Letters Patent is hereby corrected as shown below:

Title page, item [73], Assignee: should read--Commissariat A L'Energie Atomique, Paris France--.

Signed and Sealed this

Second Day of January, 1996

Attest:

BRUCE LEHMAN

Attesting Officer

Commissioner of Patents and Trademarks